(12) United States Patent
Maegawa et al.

(10) Patent No.: US 10,151,274 B2
(45) Date of Patent: Dec. 11, 2018

(54) ABNORMALITY DETECTION DEVICE FOR INTERNAL COMBUSTION ENGINE

(71) Applicant: DENSO CORPORATION, Kariya, Aichi-pref. (JP)

(72) Inventors: Yoshinori Maegawa, Kariya (JP); Masanori Kurosawa, Kariya (JP); Kosuke Nakano, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/752,933

(22) PCT Filed: Oct. 25, 2016

(86) PCT No.: PCT/JP2016/081604
§ 371 (c)(1),
(2) Date: Feb. 15, 2018

(87) PCT Pub. No.: WO2017/086104
PCT Pub. Date: May 26, 2017

(65) Prior Publication Data
US 2018/0238273 A1 Aug. 23, 2018

(30) Foreign Application Priority Data
Nov. 16, 2015 (JP) .................. 2015-223612

(51) Int. Cl.
*F02M 33/02* (2006.01)
*F02M 25/08* (2006.01)
*F02D 41/00* (2006.01)

(52) U.S. Cl.
CPC ........ *F02M 25/0809* (2013.01); *F02M 25/08* (2013.01); *F02M 25/089* (2013.01); *F02M 25/0836* (2013.01); *F02D 41/003* (2013.01)

(58) Field of Classification Search
CPC . F02M 25/08; F02M 33/02; F02M 2025/0863
USPC .................. 123/518–520; 73/114.31, 114.39
See application file for complete search history.

(56) References Cited

U.S. PATENT DOCUMENTS

| | | | |
|---|---|---|---|
| 2003/0056573 A1* | 3/2003 | Miwa ................. | F02M 25/0809 73/40.5 R |
| 2013/0081600 A1* | 4/2013 | Fukui ..................... | F01N 3/101 123/520 |
| 2014/0224212 A1* | 8/2014 | Tamura ................. | G01M 15/04 123/434 |
| 2016/0069304 A1* | 3/2016 | Guidi ................. | F02M 25/0809 123/518 |

(Continued)

FOREIGN PATENT DOCUMENTS

EP  0 509 782  10/1992

*Primary Examiner* — John Kwon
(74) *Attorney, Agent, or Firm* — Nixon & Vanderhye P.C.

(57) ABSTRACT

An abnormality detection device of an internal combustion engine includes an ECU that is an abnormality detection unit detecting a leakage occurrence of a second pure pipe. When the internal combustion engine is in a supercharging operation state that a supercharger operates and the second purge pipe is closed by a second purge valve, the ECU detects the leakage occurrence of the second purge pipe based on a differential pressure between a pressure in the second purge pipe and an atmospheric pressure. In this case, the valve pressure in the second purge pipe is a pressure in the second purge pipe between the second purge valve and the intake pipe.

14 Claims, 8 Drawing Sheets

(56) References Cited

U.S. PATENT DOCUMENTS

2017/0167415 A1* 6/2017 Tochihara .......... F02D 41/0042

* cited by examiner

ABNORMALITY DETECTION DEVICE FOR INTERNAL COMBUSTION ENGINE

CROSS REFERENCE TO RELATED APPLICATION

This application is the U.S. national phase of International Application No. PCT/JP2016/081604 filed Oct. 25, 2016, which designated the U.S. and claims priority to Japanese Patent Application No. 2015-223612 filed on Nov. 16, 2015, the entire contents of each of which are hereby incorporated herein by reference.

TECHNICAL FIELD

The present disclosure relates to an abnormality detection device of an internal combustion engine which detects a leakage occurrence of a purge pipe supplying an evaporation fuel to a position in an intake pipe of the internal combustion engine upstream of a supercharger.

BACKGROUND ART

It is a known technology that a fuel consumption of an internal combustion engine (engine) is improved by supplying an evaporation fuel (equivalent to evaporation gas) that is not combusted to an intake pipe of the engine. For example, Patent Literature 1 discloses a device which temporarily collects the evaporation fuel that is generated by an evaporation of a fuel in a fuel tank at a canister and supplies the evaporation fuel to the intake pipe. The evaporation fuel is supplied from the canister to the intake pipe through a purge pipe connected with the canister and the intake pipe. A purge of the evaporation fuel from the canister is executed by using a negative pressure generated by an air that is used in a combustion and flows through the intake pipe. The device according to Patent Literature 1 executes a diagnosis of a supply system of the evaporation fuel including the canister. Specifically, the device senses a pressure in the fuel tank and diagnoses whether an abnormality of the supply system exists based on the pressure.

PRIOR ART LITERATURES

Patent Literature

Patent Literature 1: JPH04-318269A

SUMMARY OF INVENTION

However, it is known that a technology decreasing an exhaust gas quantity of the engine such as a downsizing is used as an improvement policy recently. It is know that an engine with a supercharger which is downsized and has an output capability as the same level as the engine discharging a high exhaust gas quantity. The engine with the supercharger can correct an output decreased due to the downsizing by using the supercharger. The supercharger drives a turbine by using a kinetic energy of a combustion gas discharged from the engine, and compresses the air used in the combustion by a compressor driven together with the turbine. The air that is used in the combustion and is compressed by the compressor is supplied into a combustion chamber through the intake pipe.

In the engine with the supercharger, an operation time interval where the engine is in a negative-pressure region is decreased. Alternatively, when the engine is in an operation where the engine is in a supercharging region, a position of the intake pipe downstream of the compressor becomes a positive pressure by a driving of the compressor. Thus, it is necessary that the purge pipe that supplies the evaporation fuel is connected with a position of the intake pipe upstream of the compressor to maintain the negative pressure generated at the intake pipe. As the above configuration, the evaporation fuel can be purged from the canister to the intake pipe even when the engine is in a supercharging operation state, and the evaporation fuel can be positively circulated to the engine.

According to a detailed study of the inventors, in the engine including the supercharger and the purge pipe, it is possible that the evaporation fuel is discharged from the purge pipe to the atmosphere in a case where an abnormality such as a poor connection between the purge pipe and the intake pipe occurs. Since Patent Literature 1 does not mention a configuration relative to the purge pipe, Patent Literature 1 does not disclose a detailed technology that detects an abnormality of the purge pipe.

It is an object of the present disclosure to provide an abnormality detection device of an internal combustion engine which can accurately detect an abnormality of a purge pipe supplying an evaporation fuel to a position in an intake pipe of the internal combustion engine upstream of a supercharger.

According to an aspect of the present disclosure, the abnormality detection device of the internal combustion engine includes a canister to absorb an evaporation fuel that is generated by an evaporation of a fuel in a fuel tank, a purge pipe to be connected between the canister and an upstream part of an intake pipe of the internal combustion engine upstream of a supercharger, the purge pipe to supply the evaporation fuel to the intake pipe, a switching unit to be located in the purge pipe, the switching unit to switch to open/close the purge pipe, and an abnormality detection unit to detect a leakage occurrence of the purge pipe based on a differential pressure between an intake pipe-side pipe pressure (BA) and a reference pressure that is predetermined, when the internal combustion engine is operating at a specified operation condition where a pressure at the upstream part is a negative pressure and the purge pipe is closed by the switching unit, wherein the intake pipe-side pipe pressure is a pressure at a position in the purge pipe between the switching unit and the intake pipe.

When the internal combustion engine is operating at the specified operation condition where the upstream part of the intake pipe upstream of the supercharger is a negative pressure and the purge pipe is normally connected with the intake pipe, the pipe pressure in the purge pipe is also a negative pressure. Thus, the differential pressure between the pipe pressure and the reference pressure becomes relatively large. When the leakage abnormality occurs at the purge pipe, the purge pipe communicates with the atmosphere. In this case, the pipe pressure is equal to an atmospheric pressure other than a negative pressure, and the differential pressure between the pipe pressure and the reference pressure becomes relatively small. The abnormality detection device of the internal combustion engine according to the aspect of the present disclosure can accurately detect the leakage occurrence of the purge pipe based on the differential pressure by using a characteristic correlative to the differential pressure between the pipe pressure of the purge pipe and the reference pressure.

According to the present disclosure, the abnormality detection device of the internal combustion engine which can accurately detect the abnormality of the purge pipe supplying the evaporation fuel to the position in the intake pipe of the internal combustion engine upstream of the supercharger can be provided.

DESCRIPTION OF EMBODIMENTS

Figure 1:
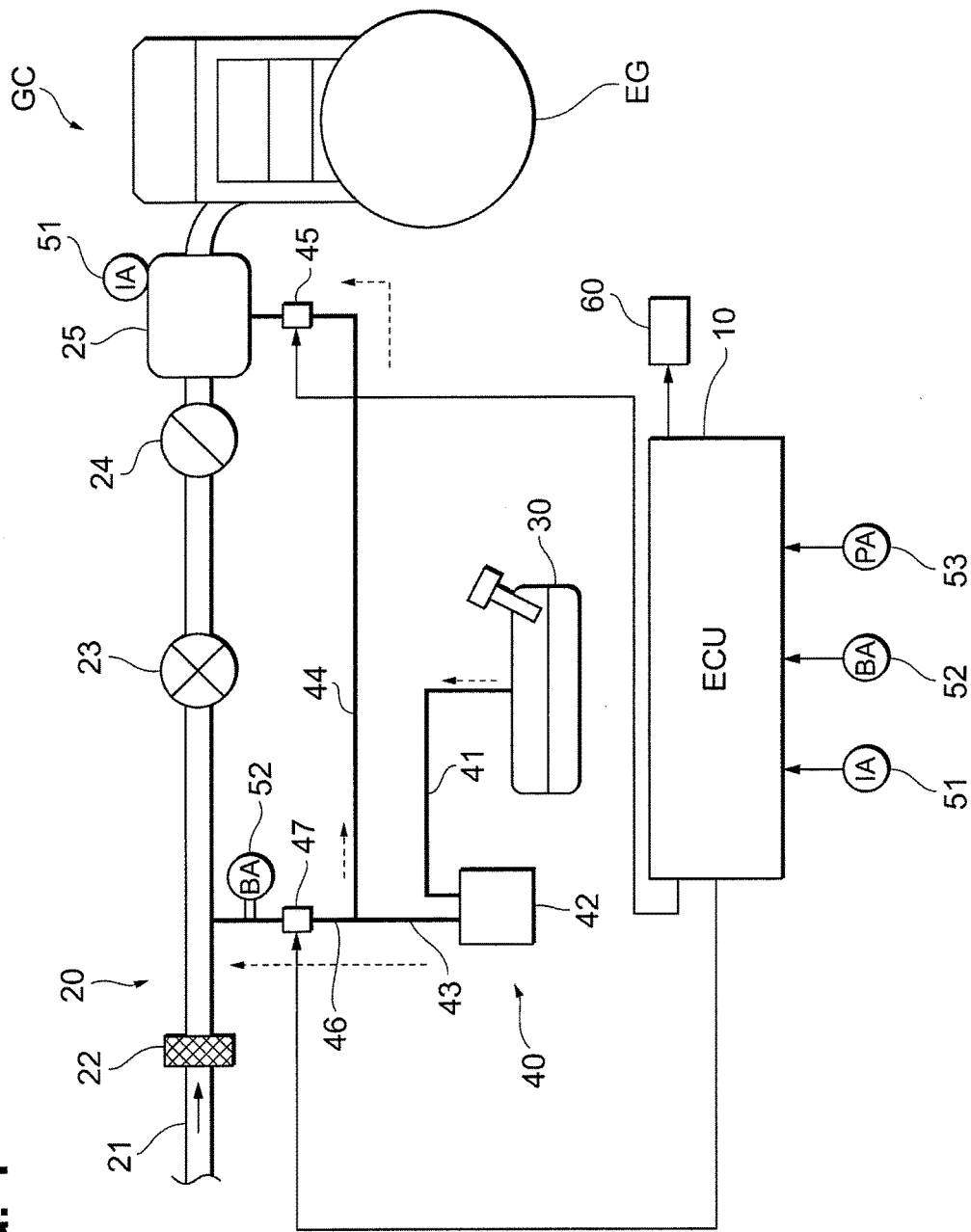
FIG. 1 is a schematic diagram showing an outline of a vehicle to which an abnormality detection device of an internal combustion engine is applied, according to a first embodiment of the present disclosure.

Embodiments of the present disclosure will be described hereafter referring to drawings. The substantially same parts or components as those in the embodiments are indicated with the same reference numerals and the same descriptions may be omitted.

First Embodiment

Figure 2:
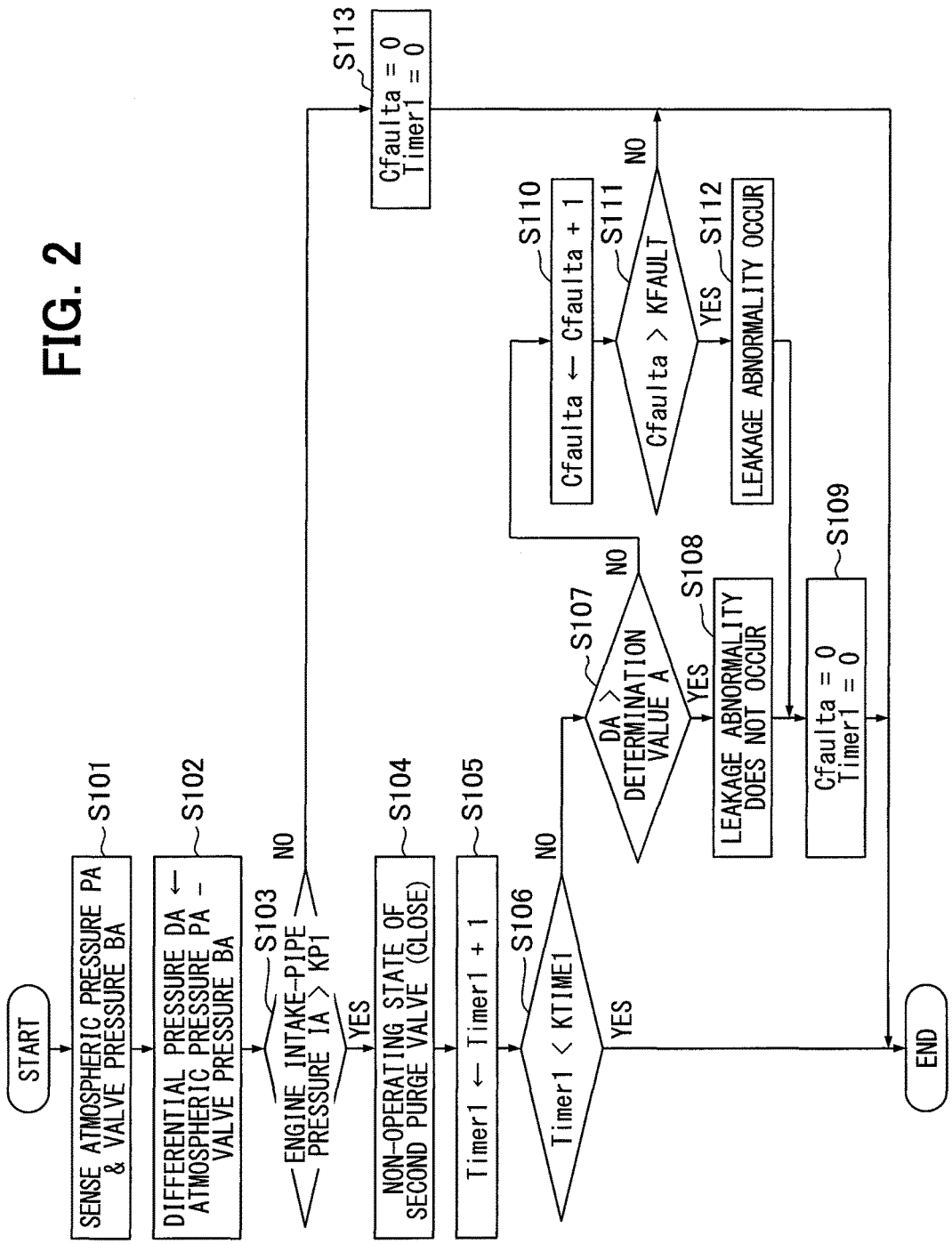
FIG. 2 is a flowchart showing a leakage abnormality diagnosis operation of a second purge pipe, according to the first embodiment.

Referring to FIGS. 1 and 2, a first embodiment of the present disclosure will be described. Referring to FIG. 1, a constitution of a vehicle GC to which an abnormality detection device of an internal combustion engine is applied according to the first embodiment will be described. As shown in FIG. 1, the vehicle GC includes an engine EG, an electronic control unit (ECU) 10, an intake system 20, a fuel tank 30 and an evaporation gas supplying system 40.

The engine EG is the internal combustion engine uses a gasoline as a fuel. The engine EG is located in an engine room of the vehicle GC. The engine EG includes multiple cylinders that are not shown. Each of the cylinders generates a torque by repeatedly executing strokes including an intake stroke, a compression stroke, a combustion stroke and an exhaust stroke. Each of the cylinders outputs the torque through a crank shaft that is not shown and is included in the engine EG. The torque is used in a travelling of the vehicle GC.

The intake system 20 is a component that supplies an air used in a combustion of each of the cylinders of the engine EG. The intake system 20 includes an intake pipe 21, an air element 22, a compressor 23 (supercharger) and a throttle valve 24.

The intake pipe 21 is a tubular member that includes a passage. The intake pipe 21 includes an intake manifold 25 located at a downstream of the intake pipe 21. The intake manifold 25 divides into multiple branches. When the intake pipe 21 draws the air from an exterior of the vehicle GC and divides and introduces the air into each of the cylinders of the engine EG.

The air element 22 is a member that is a filter shape and removes a foreign matter from a fluid flowing through the member. The air element 22 is located in the intake pipe 21. Thus, the air element 22 removes a foreign matter in the air that is drawn from the exterior of the vehicle GC and is supplied to the engine EG.

The compressor 23 is a fluid machine that compresses the fluid by rotating. The compressor 23 is a part of the supercharger. The compressor 23 is located at a position of the intake pipe 21 downstream of the air element 22. The compressor 23 is connected with a turbine that is not shown and is another part of the supercharger. The turbine is a motor that convers an energy of the fluid into a mechanical power. The turbine is located in an exhaust gas passage that is not shown. When a combustion gas generated in the combustion stroke of the engine EG flows through the exhaust gas passage, the turbine rotates by using an energy of the combustion gas. The turbine outputs a rotation torque transmitted to the compressor 23 through a shaft that is not shown. Thus, the compressor 23 rotates, suctions and compresses the air upstream of the intake pipe 21, and supplies the air to a region downstream of the intake pipe 21.

The throttle valve 24 is an on-off valve that is located at a position of the intake pipe 21 downstream of the compressor 23. The throttle valve 24 includes an electric motor and a valve body that are not shown. The electric motor is driven based on a control signal received from the ECU 10, and moves the valve body. When the valve body is moved, an opening degree of an inner passage of the throttle valve 24.

The fuel tank 30 is a tank accumulating the gasoline that is the fuel of the engine EG. Generally, the fuel is a liquid and is accumulated in the fuel tank 30. The fuel tank 30 includes a fuel pump that is not shown and is located in the fuel tank 30. The fuel pump is driven based on a control signal received from the ECU 10, and feeds the fuel to a fuel supply pipe that is not shown and is connected with the fuel tank 30. The fuel is introduced into the engine EG by the fuel supply pipe, and is supplied to each of the cylinders when being injected from an injector that is not shown into a spray.

The evaporation gas supplying system 40 is a component that supplies an evaporation fuel (hereafter, the evaporation fuel is equivalent to an evaporation gas) that is a gaseous gasoline generated at the fuel tank 30 to the intake pipe 21 or the intake manifold 25. The evaporation gas supplying system 40 includes a communication pipe 41, a canister 42 and a purge pipe 43.

The communication pipe 41 is a tubular member that is located between the fuel tank 30 and the canister 42. The communication pipe 41 has a first end and a second end those are connected with the fuel tank 30 and the canister 42, respectively. The fuel tank 30 and the canister 42 communicate with each other through the communication pipe 41.

The canister 42 has an inner space in which an absorbent that is not shown is located. The absorbent may have a porous member including multiple pores at a surface of the porous member, such as an activated carbon. The canister 42 defines an opening that is not shown. The canister 42 is exposed to the atmosphere through the opening.

The purge pipe 43 is a tubular member that has a first end connected with the canister 42. The purge pipe 43 extends from the canister 42 and divides into a first purge pipe 44 and a second purge pipe 46. The first purge pipe 44 has a first end connected with a second end of the purge pipe 43, and a second end connected with the intake manifold 25. A first purge valve 45 that is an on-off valve is located at a position of an intermediate part of the first purge pipe 44. The second purge pipe 46 has a first end connected with the second end of the purge pipe 43, and a second end connected with the intake pipe 21. Specifically, the second end of the second purge pipe 46 is connected with a position of the intake pipe 21 upstream of the compressor 23 and downstream of the air element 22. A second purge valve 47 that is an on-off valve is located at a position of an intermediate part of the second purge pipe 46.

Next, functions of the evaporation gas supplying system 40 having the above constitution will be described. When the fuel in the fuel tank 30 evaporates to generate the evaporation gas, the evaporation gas is introduced into the canister 42 through the communication pipe 41.

The evaporation gas that is introduced by the canister 42 is absorbed by the absorbent that is located in the inner space. When a pressure in the purge pipe 43 becomes a negative pressure, the evaporation gas that is absorbed by the absorbent is discharged from the absorbent by the negative pressure.

For example, when the engine EG is operating without driving the compressor 23, the first purge valve 45 is open. Thus, a negative pressure generated by a flow of the air flowing through the intake manifold 25 in a region downstream of the intake pipe 21 applies to the purge pipe 43 and the canister 42 through the first purge pipe 44. When a pressure in the canister 42 becomes a negative pressure, the air is drawn from the opening to pass through the absorbent. Thus, the evaporation gas is discharged from the absorbent into the air.

When the engine EG is operating in a case where the compressor 23 is driven, the second purge valve 47 is open. As the above description, the second purge pipe 46 including the second purge valve 47 is connected with a position in the intake pipe 21 upstream of the compressor 23. Thus, when the compressor 23 is driven, a negative pressure generated by a driving of the compressor 23 applies to the purge pipe 43 and the canister 42 through the second purge pipe 46. When the pressure in the canister 42 becomes in a negative pressure, the air is drawn from the opening to pass through the absorbent. Thus, the evaporation gas is discharged from the absorbent into the air.

In addition, when the compressor 23 is driven, a pressure in the intake manifold 25 downstream of the compressor 23 becomes a positive pressure. Thus, the first purge valve 45 is closed to prevent an entering of the air from the intake manifold 25 to the first purge pipe 44.

The evaporation gas discharged from the absorbent in the canister 42 flows into the intake pipe 21 and joins the air flowing through an interior of the intake pipe 21. A mixed fluid of the evaporation gas and the air flows through the intake pipe 21 and is introduced into each of the cylinders of the engine EG. Thus, the evaporation gas is used in an operation of the engine EG without being discharged to the atmosphere, and a fuel consumption of the engine EG can be improved.

The ECU 10 is a component that controls operations of vehicle devices in the vehicle GC such as the engine EG, the intake system 20 or the evaporation gas supplying system 40, based on various information obtained from sensors in the vehicle GC. The ECU 10 is electrically connected with various sensors including an intake pressure sensor 51, a pressure sensor 52 and an atmospheric-pressure sensor 53.

The intake pressure sensor 51 is located at the intake manifold 25 as shown in FIG. 1. The intake pressure sensor 51 is a sensor that generates and sends a signal corresponding to a pressure (hereafter, the pressure is equivalent to an engine intake-pipe pressure IA and an intake pipe-side pipe pressure) of a fluid flowing through the intake manifold 25.

The pressure sensor 52 is located at a position in the second purge pipe 46 between the second purge valve 47 and the intake pipe 21. The pressure sensor 52 is a sensor that generates and sends a signal corresponding to a pressure (hereafter, the pressure is equivalent to a valve pressure BA) of the evaporation gas flowing through the second purge pipe 46.

The atmospheric-pressure sensor 53 is located at a position of the vehicle GC that is in contact with an outside air. The atmospheric-pressure sensor 53 is a sensor that generates and sends a signal corresponding to an atmospheric pressure PA.

The ECU 10 is electrically connected with various vehicle devices including the engine EG, the throttle valve 24, the supercharger and a notification device 60. The ECU 10 controls an operation of the engine EG by sending control signals to the various vehicle devices. The ECU 10 is electrically connected with the first purge valve 45 and the second purge valve 47. The ECU 10 controls a circulation operation of the evaporation gas by the evaporation gas supplying system 40 by sending the control signals to properly switch to open or close the first purge valve 45 or the second purge valve 47.

The notification device 60 is a device that executes various notifications to a passenger of the vehicle GC. The notification device 60 is constituted by a known device such as a display panel or a buzzer. The ECU 10 controls an operation of the notification device 60 by sending the control signal.

The ECU 10 is physically constituted by a computer system including a CPU, a ROM, a RAM and an input-output interface. The CPU loads an application program stored in the ROM to the RAM and executes the application program to execute a loading and a writing of data in the RAM or the ROM to achieve the above functions of the ECU 10.

In addition, the second purge pipe 46 functions as a purge pipe that is connected between an upstream part of the intake pipe 21 upstream of the compressor 23 (supercharger) and the canister 42 and supplies the evaporation gas (evaporation fuel) to the intake pipe 21. The second purge valve 47 functions as a switching unit that is located in the second purge pipe 46 and switches to open/close the second purge pipe 46. In this case, the second purge valve 47 switched to open and close the second purge pipe 46. The ECU 10, the second purge pipe 46 and the second purge valve 47 function as an abnormality detection device of the engine EG (internal combustion engine) which detects a leakage abnormality of the second purge pipe 46.

However, in the vehicle GC having the above constitution, it is possible that a malfunction relative to an operation of the evaporation gas occurs due to an occurrence of the abnormality at the second purge pipe 46. In other words, it is possible that the evaporation gas flowing through the second purge pipe 46 is discharged into the atmosphere, in a case where the second purge pipe 46 that is connected with the intake pipe 21 when the second purge pipe 46 is normal is removed from the intake pipe 21 (hereafter, pipe removing), or in case where a connection part of the second purge pipe 46 and the intake pipe 21 or an inner wall of the second purge pipe 46 is damaged to generate a leakage (hereafter, pipe leakage). Hereafter, the above phenomenons are equivalent to the leakage abnormality. Since it is necessary to repair the second purge pipe 46 at a dealer or a maintenance facility when the leakage abnormality occurs, it is requested to rapidly detect the abnormality and notify a user of the vehicle GC. In addition, the occurrence of the leakage abnormality is equivalent to a leakage occurrence.

According to the present embodiment, the ECU 10 executes a leakage abnormality diagnosis operation to determine whether the leakage abnormality of the second purge pipe 46 occurs. Referring to a flowchart shown in FIG. 2, an abnormality determination operation of the leakage abnormality of the second purge pipe 46 executed by the ECU 10 will be described. The abnormality determination operation shown in FIG. 2 can be executed at a timing that the supercharger is initially driven after a start of the engine EG. In addition, initial values of a timer value Timer1 and a counter value Cfaulta used in the flowchart are set to be zero.

At step S101, the ECU 10 senses the atmospheric pressure PA used as a reference pressure and the valve pressure BA. The ECU 10 senses the atmospheric pressure PA based on a signal received from the atmospheric-pressure sensor 53 and senses the valve pressure BA based on a signal received from the pressure sensor 52. As the above description, the valve pressure BA is the pressure of the evaporation gas at a position in the second purge pipe 46 between the second purge valve 47 and the intake pipe 21. When an operation at step S101 is completed, the ECU 10 proceeds to step S102.

At step S102, the ECU 10 calculates a differential pressure DA between the atmospheric pressure PA and the valve pressure BA sensed at step S101. The ECU 10, for example, calculates the differential pressure DA by subtracting the valve pressure BA from the atmospheric pressure PA that is used as the reference pressure. When an operation at step S102 is completed, the ECU 10 proceeds to step S103.

At step S103, the ECU 10 determines whether the engine intake-pipe pressure IA is greater than a supercharging threshold KP1 that is predetermined. The ECU 10 senses the engine intake-pipe pressure IA based on a signal received from the intake pressure sensor 51. The engine intake-pipe pressure IA is a pressure of an intake air flowing through the intake manifold 25. The supercharging threshold KP1, for example, can be set to a value corresponding to a minimum value of an intake pressure in a supercharging operation state where the intake system 20 drives the supercharger. When the ECU 10 determines that the engine intake-pipe pressure IA is greater than the supercharging threshold KP1 at step S103 (step S103 is Yes), the ECU 10 determines that the engine EG is in the supercharging operation state, determines that the engine EG is an operation state where the ECU 10 can allow an abnormality determination, and then proceeds to step S104. When the ECU 10 determines that the engine intake-pipe pressure IA is less than or equal to the supercharging threshold KP1 (step S103 is No), the ECU 10 determines that the engine EG is not in the supercharging operation state, determines that the engine EG is in an operation state where the ECU 10 cannot allow the abnormality determination, and then proceeds to step S113.

At step S104, the ECU 10 controls the second purge valve 47 to be in a non-operating state. In other words, the ECU 10 closes the second purge valve 47 to be in a closed state. The ECU 10 executes an operation at step S104 to prevent the valve pressure BA sensed by the pressure sensor 52 from being affected by a pressure variation in the fuel tank 30 and the canister 42. When the operation at step S104 is completed, the ECU 10 proceeds to step S105.

At step S105, the ECU 10 counts up a timer value Timer1. In other words, the ECU 10 adds one to the timer value Timer1. The timer value Timer1 indicates an elapsed time interval from a time point that the ECU 10 controls the second purge valve 47 to be in the non-operating state at step S104. When an operation at step S105 is completed, the ECU 10 proceeds to step S106.

At step S106, the ECU 10 determines whether the timer value Timer1 is less than a stabilization threshold KTIME1 that is predetermined. The stabilization threshold KTIME1 indicates a required time interval from the time point that the ECU 10 controls the second purge valve 47 to be in the non-operating state to a time point that the valve pressure BA that is the pressure in the second purge pipe 46 becomes stable. When the ECU 10 determines that the timer value Timer1 is greater than or equal to the stabilization threshold KTIME1 at step S106 (step S106 is No), the ECU 10 determines that the required time interval has elapsed since the time point that the ECU 10 controls the second purge valve 47 to be in the non-operating state, determines that the valve pressure BA is stable, and then proceeds to step S107. When the ECU 10 determines that the timer value Timer1 is less than the stabilization threshold KTIME1 (step S106 is Yes), the ECU 10 determines that the valve pressure BA is unstable, terminates the present leakage abnormality diagnosis operation to prevent an erroneous determination.

At step S107, the ECU 10 determines whether the differential pressure DA calculated at step S102 is greater than a determination value A (threshold) that is predetermined. When the second purge pipe 46 is normally connected with the intake pipe 21 at a position upstream of the supercharger (compressor 23), the valve pressure BA becomes a negative pressure according to a pressure loss generated between the air element 22 and the compressor 23 by the supercharging operation state of the engine EG. In this case, the differential pressure DA calculated at step S102 becomes a positive value. When a leakage abnormality of the second purge pipe 46 occurs such as the pipe removing or the pipe leakage, the valve pressure BA becomes a pressure corresponding to the atmospheric pressure. In this case, the differential pressure DA calculated at step S102 indicates a value in the vicinity of zero. The determination value A is set to determine a normal state and a leakage abnormal state. For example, the determination value A can be set to a positive value close to the differential pressure in the normal state.

When the ECU 10 determines that the differential pressure DA is greater than the determination value A at step S107 (step S107 is Yes), the ECU 10 determines that the second purge pipe 46 is normally connected with the intake pipe 21. In this case, at step S108, the ECU 10 determines that the leakage abnormality does not occur. At step S109, the ECU 10 resets the timer value Timer1 and the counter value Cfaulta (sets both the time value Timer1 and the counter value Cfaulta to zero), and then terminates the present leakage abnormality diagnosis operation.

When the ECU 10 determines that the differential pressure DA is less than or equal to the determination value A at step S107 (step S107 is No), the ECU 10 determines that the leakage abnormality occurs at the second purge pipe 46. At step S110, the ECU 10 counts up the counter value Cfaulta. In other words, the ECU 10 adds one to the counter value Cfaulta. The counter value Cfaulta indicates a continuous time interval where the differential pressure DA is less than or equal to the determination value A. When an operation at step S110 is completed, the ECU 10 proceeds to step S111.

At step S111, the ECU 10 determines whether the counter value Cfaulta is greater than a determination threshold KFAULT that is predetermined. The determination threshold KFAULT indicates a required time interval from a time point that the differential pressure DA becomes less than or equal to the determination value A to a time point that a phenomenon where the differential pressure DA is continuously being less than or equal to the determination value A is ensured to be generated due to the leakage occurrence. When the ECU 10 determines that the counter value Cfaulta is greater than the determination threshold KFAULT that is predetermined at step S111 (step S111 is Yes), the ECU 10 ensures that the leakage abnormality occurs at the second purge pipe 46. In this case, at step S112, the ECU 10 determines that the leakage abnormality occurs. At step S109, the ECU 10 resets the timer value Timer1 and the counter value Cfaulta (sets both the time value Timer1 and the counter value Cfaulta to zero), and then terminates the present leakage abnormality diagnosis operation. The ECU 10 can execute a notification of the leakage occurrence to a driver of the vehicle GC through the notification device 60, while executing an operation at step S112.

When the ECU 10 determines that the counter value Cfaulta is less than or equal to the determination threshold KFAULT that is predetermined at step S111 (step S111 is No), the ECU 10 determines that a sufficient time interval has not elapsed to ensure the leakage occurrence. In this case, the ECU 10 terminates the present leakage abnormality diagnosis operation to prevent an erroneous determination.

Since the ECU 10 determines that the engine EG is in an operation state where the ECU 10 cannot allow the abnormality determination at step S103, at step S113, the ECU 10 resets the timer value Timer1 and the counter value Cfaulta (sets both the time value Timer1 and the counter value Cfaulta to zero), and then terminates the present leakage abnormality diagnosis operation to prevent an erroneous determination.

Next, effects of the abnormality detection device of the internal combustion engine according to the first embodiment will be described.

The abnormality detection device of the internal combustion engine according to the first embodiment includes the canister 42 that absorbs the evaporation gas that is generated by an evaporation of the fuel in the fuel tank 30, the second purge pipe 46 that is connected between the canister 42 and the upstream part of the intake pipe 21 of the engine EG upstream of the compressor 23 and supplies the evaporation gas to the intake pipe 21, the second purge valve 47 that is located in the second purge pipe 46 and switches to open/close the second purge pipe 46, and the ECU 10 that is an abnormality detection unit detecting the leakage occurrence of the second purge pipe 46. When the engine EG is in the supercharging operation state that the supercharger operates and the second purge pipe 46 is closed by the second purge valve 47, the ECU 10 detects the leakage occurrence of the second purge pipe 46 based on the differential pressure DA between the atmospheric pressure PA that is the reference pressure and the intake pipe-side pipe pressure (valve pressure BA) that is the pressure at a position in the second purge pipe 46 between the second purge valve 47 and the intake pipe 21. In this case, the reference pressure is predetermined.

When the second purge pipe 46 is normally connected with the intake pipe 21 in the supercharging operation state of the engine EG, a position of the intake pipe 21 upstream of the compressor 23 becomes in a negative pressure. In this case, when the second purge valve 47 is closed, the valve pressure BA of the second purge pipe 46 also becomes a negative pressure. Thus, the differential pressure DA between the valve pressure BA and the atmospheric pressure PA becomes relatively large. When the leakage abnormality occurs at the second purge pipe 46, the second purge pipe 46 communicates with the atmosphere. In this case, the valve pressure BA is equal to the atmospheric pressure PA even when the second purge valve 47 is closed. Thus, the differential pressure DA between the valve pressure BA and the atmospheric pressure PA becomes relatively small. The abnormality detection device of the internal combustion engine according to the first embodiment can accurately detect the leakage occurrence of the second purge pipe 46 based on the differential pressure DA by using an above characteristic correlative to the differential pressure DA between the valve pressure BA and the atmospheric pressure PA. Thus, the abnormality detection device of the internal combustion engine according to the first embodiment can accurately detect the leakage occurrence of the second purge pipe 46 that supplies the evaporation gas to a position of the intake pipe 21 of the engine EG upstream of the supercharger.

The abnormality detection device of the internal combustion engine according to the first embodiment further includes the pressure sensor 52 that is located at a position of the second purge pipe 46 between the second purge valve 47 and the intake pipe 21 and senses the valve pressure BA, and the atmospheric-pressure sensor 53 that senses the atmospheric pressure PA. The ECU 10 that is equivalent to the abnormality detection unit calculates the differential pressure DA between the valve pressure BA sensed by the pressure sensor 52 and the atmospheric pressure PA sensed by the atmospheric-pressure sensor 53. The ECU 10 detects the leakage occurrence of the second purge pipe 46 when the differential pressure DA is less than or equal to the determination value A.

As the above configuration, since the pressure sensor 52 and the atmospheric-pressure sensor 53 can directly measure the valve pressure BA and the atmospheric pressure PA that are used in a calculation of the differential pressure DA, the ECU 10 can further accurately determine the leakage occurrence of the second purge pipe 46 based on the differential pressure DA.

Second Embodiment

Figure 3:
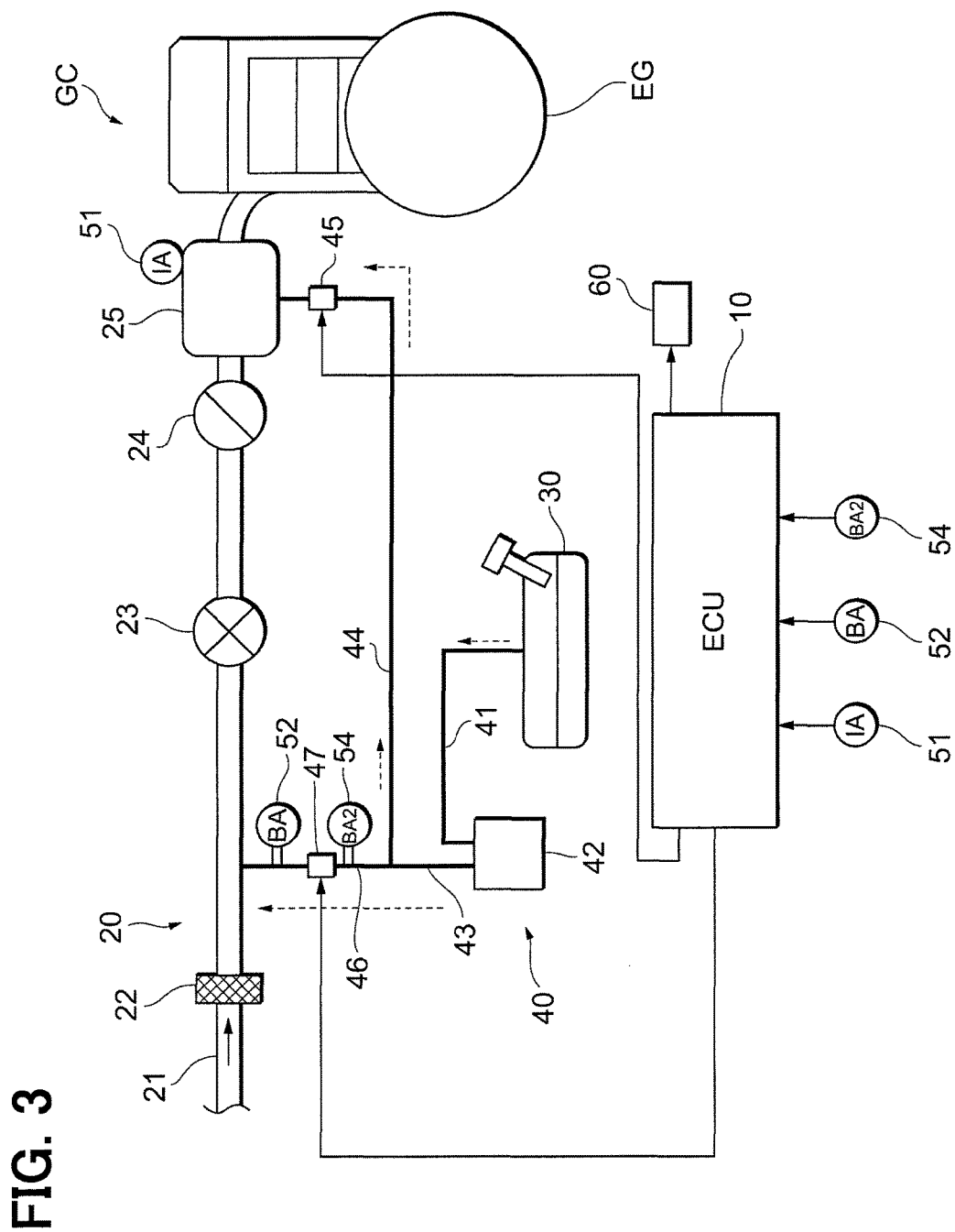
FIG. 3 is a schematic diagram showing an outline of the vehicle to which the abnormality detection device of the internal combustion engine is applied, according to a second embodiment of the present disclosure.
Figure 4:
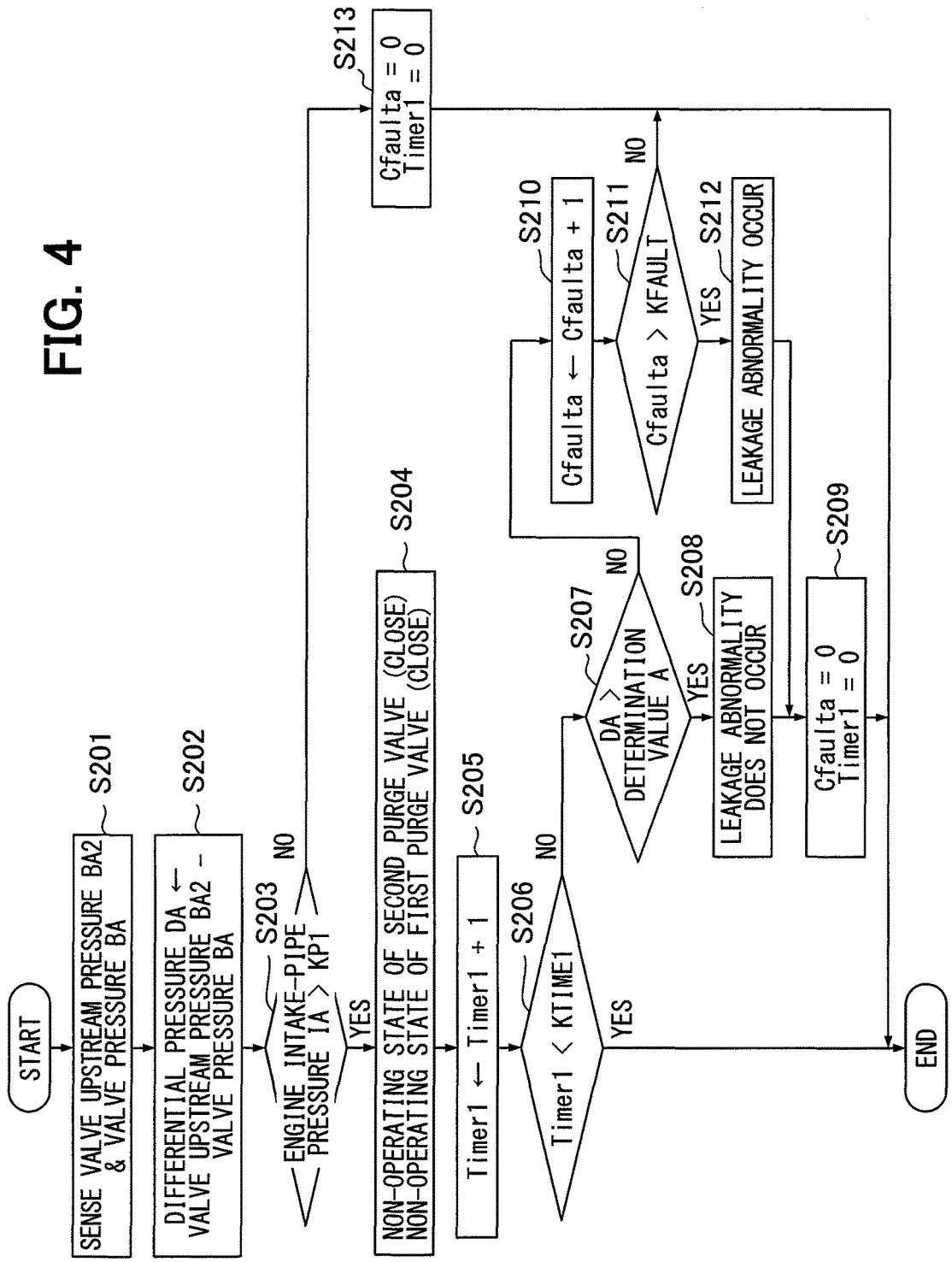
FIG. 4 is a flowchart showing the leakage abnormality diagnosis operation of the second purge pipe, according to the second embodiment.

Referring to FIGS. 3 and 4, a second embodiment of the present embodiment will be described. The second embodiment differs from the first embodiment that a canister-side pipe pressure is used as the reference pressure of the differential pressure DA that is used in a detection of the leakage abnormality of the second purge pipe 46, instead of the atmospheric pressure PA. The canister-side pipe pressure (hereafter, the canister-side pipe pressure is equivalent to a valve upstream pressure BA2) is a pressure at a position in the second purge pipe 46 between the second purge valve 47 and the canister 42.

As shown in FIG. 3, the pressure sensor 52 (first pressure sensor) that senses the valve pressure BA and a pressure sensor 54 (second pressure sensor) are located in the second purge pipe 46. The pressure sensor 54 is located at a position of the second purge pipe 46 between the second purge valve 47 and the canister 42. The pressure sensor 54 is a sensor that generates and sends a signal corresponding to the pressure (valve upstream pressure BA2) of the evaporation gas flowing through the second purge pipe 46.

The ECU 10 is electrically connected with the pressure sensor 54. The ECU 10 can sense the valve upstream pressure BA2 based on the signal transmitted from the pressure sensor 54. In the leakage abnormality diagnosis operation of the second purge valve 47, the ECU 10 calculates the differential pressure DA between the valve pressure BA sensed by the pressure sensor 52 and the valve upstream pressure BA2 sensed by the pressure sensor 54 and detects the leakage occurrence of the second purge pipe 46 when the differential pressure DA is less than or equal to the determination value A.

A flowchart shown in FIG. 4 is generally the same as the flowchart shown in FIG. 2. In operations at step S201 and step S202, the atmospheric pressure PA at step S101 and step S102 shown in FIG. 2 is only replaced by the valve upstream pressure BA2 sensed by the pressure sensor 54. Operations at step S203 and step S205 to step S213 are the same as the operations at step S103 and step S105 to step S113 shown in FIG. 2.

At step S204, the ECU 10 controls the first purge valve 45 to be in a non-operating state in addition of controlling the second purge valve 47 to be in the non-operating state at step S104. In other words, the ECU 10 closes the first purge valve 45 to be in a closed state. A part of the second purge pipe 46 where the pressure sensor 54 is located always communicates with the canister 42 that is located at a position upstream of the purge pipe 43. As the above description, since the canister is exposed to the atmosphere by the opening that is not shown, the valve upstream pressure BA2 corresponds to the atmospheric pressure in a case where the second purge valve 47 is in the closed state in the supercharging operation state. In this case, since the pressure in the intake manifold 25 is a positive pressure, it is possible that the intake air in the intake manifold 25 flows backward to the second purge pipe 46 or to the canister 42 according to a pressure difference between the valve upstream pressure BA2 and the engine intake-pipe pressure IA when the first purge valve 45 is opened. When an above backflow is generated, the valve upstream pressure BA2 increases from the pressure corresponding to the atmospheric pressure, and an accuracy of the differential pressure DA is deteriorated. Thus, according to the second embodiment, both the first purge valve 45 and the second purge valve 47 are closed to prevent a generation of the above backflow.

Since the valve upstream pressure BA2 (canister-side pipe pressure) used as the reference pressure of the differential pressure DA is the pressure corresponding to the atmospheric pressure, the abnormality detection device of the internal combustion engine according to the second embodiment detects the leakage occurrence of the second purge pipe 46 by substantially the same manner as the first embodiment where the atmospheric pressure PA is used as the reference pressure of the differential pressure DA. Thus, the abnormality detection device of the internal combustion engine according to the second embodiment can achieve the same effects as that according to the first embodiment can.

A pipe pressure in a purge pipe that is a pressure in the purge pipe varies according to an operation state of the engine EG. According to the second embodiment, the valve upstream pressure BA2 that varies according to the operation state the same as the valve pressure BA and is the pipe pressure in the purge pipe the same as the valve pressure BA, is used as the reference pressure in the calculation of the differential pressure DA for a diagnosis of the leakage abnormality. Thus, comparing a configuration where the atmospheric pressure PA is used as the reference pressure, the abnormality detection device of the internal combustion engine according to the second embodiment can measure the differential pressure DA that is more stable and is more difficult to be affected by the operation state of the engine EG and can improve a detection accuracy of the leakage abnormality of the second purge pipe 46.

Third Embodiment

Figure 5:
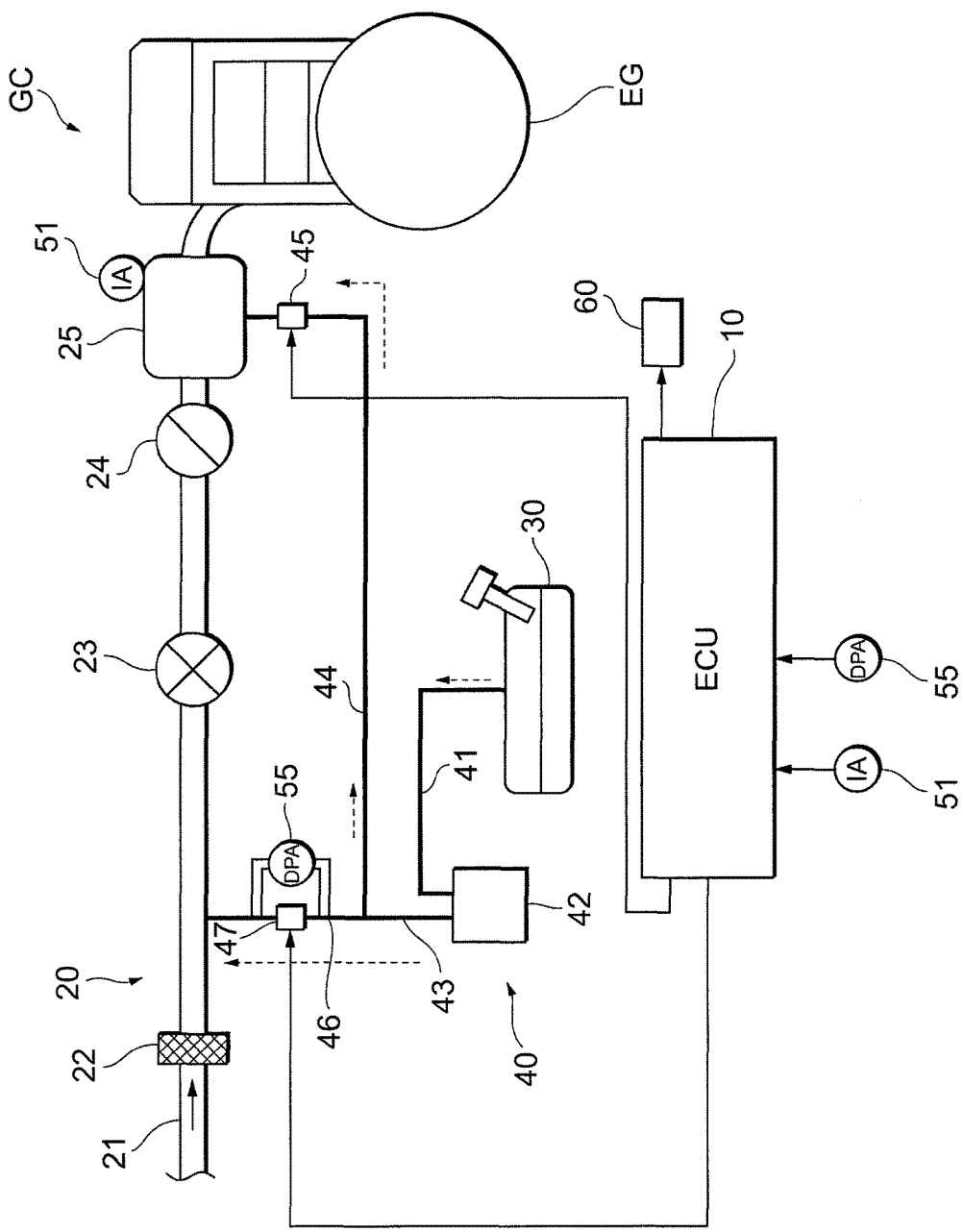
FIG. 5 is a schematic diagram showing an outline of the vehicle to which the abnormality detection device of the internal combustion engine is applied, according to a third embodiment of the present disclosure.
Figure 6:
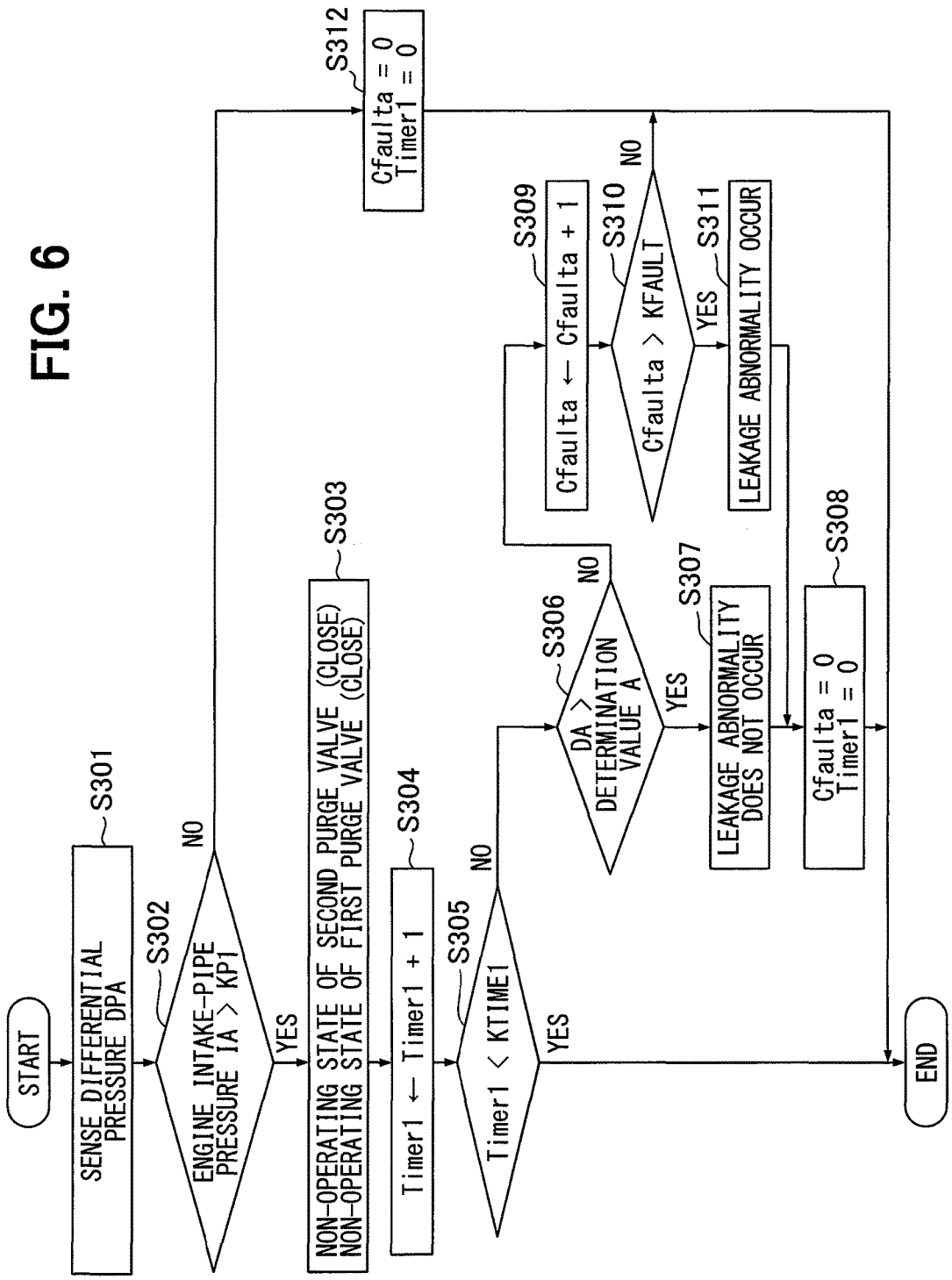
FIG. 6 is a flowchart showing the leakage abnormality diagnosis operation of the second purge pipe, according to the third embodiment.

Referring to FIGS. 5 and 6, a third embodiment of the present disclosure will be described. The third embodiment differs from the second embodiment that a single differential-pressure sensor 55 is used to sense a differential pressure DPA between (i) a pipe pressure in the second purge pipe 46 between the second purge valve 47 and the intake pipe 21 and (ii) the pipe pressure in the second purge pipe 46 between the second purge valve 47 and the canister 42.

As shown in FIG. 5, the differential-pressure sensor 55 located at a position to span the second purge valve 47 from a part of the second purge pipe 46 between the second purge valve 47 and the intake pipe 21 to a part of the second purge pipe 46 between the second purge valve 47 and the canister 42. The differential-pressure sensor 55 is a sensor that generates and sends a signal corresponding to the differential pressure DPA between the pipe pressures in the two parts.

The ECU 10 is electrically connected with the differential-pressure sensor 55. The ECU 10 can sense the differential pressure DPA based on the signal transmitted from the differential-pressure sensor 55. When the differential pressure DPA sensed by the differential-pressure sensor 55 is less than or equal to the determination value A, the ECU 10 detects the leakage occurrence of the second purge pipe 46.

A flowchart shown in FIG. 6 is generally the same as the flowchart shown in FIG. 4. An operation at step S301 replaces the operations at step S201 and step S202 shown in FIG. 4. At step S301, the ECU 10 senses the differential pressure DPA between (i) the pipe pressure in the second purge pipe 46 between the second purge valve 47 and the intake pipe 21 and (ii) the pipe pressure in the second purge pipe 46 between the second purge valve 47 and the canister 42. The ECU 10 senses the differential pressure DPA based on the signal transmitted from the differential-pressure sensor 55. When the operation at step S301 is completed, the ECU 10 proceeds to step S302.

Operations at step S302 to step S312 are the same as the operations at step S203 to step S213 shown in FIG. 2.

The abnormality detection device of the internal combustion engine according to the third embodiment, similar to the abnormality detection device of the internal combustion engine according to the second embodiment, detects the leakage occurrence of the second purge pipe 46 based on the differential pressure DPA between (i) the pipe pressure in the second purge pipe 46 between the second purge valve 47 and the intake pipe 21 and (ii) the pipe pressure in the second purge pipe 46 between the second purge valve 47 and the canister 42. Thus, the abnormality detection device of the internal combustion engine according to the third embodiment can achieve the same effects as those according to the first embodiment and the second embodiment. Since a single differential-pressure sensor 55 is used to sense the differential pressure DPA, a total number of sensors can be reduced, and a space of an entire of the abnormality detection device can be saved.

Fourth Embodiment

Figure 7:
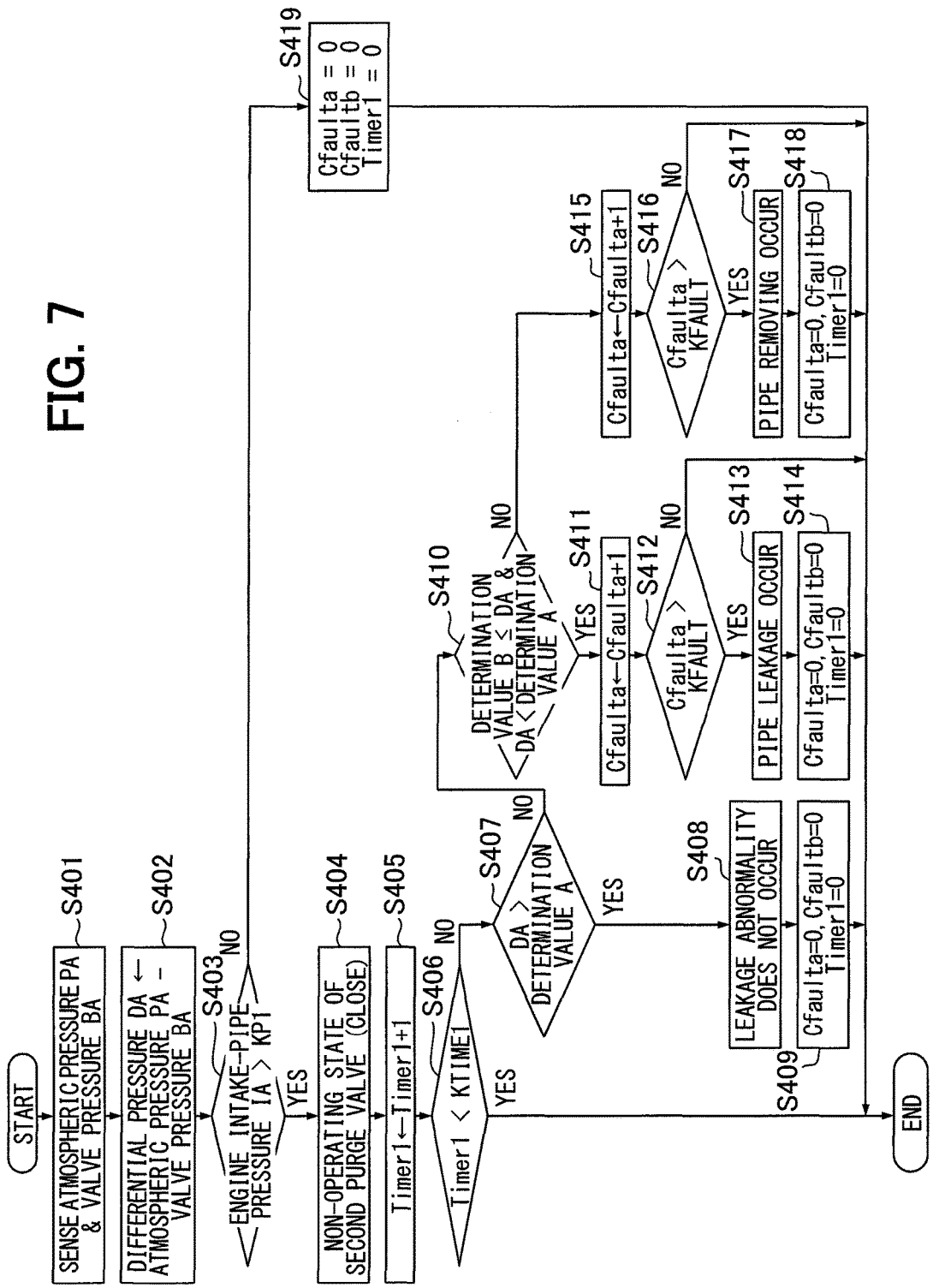
FIG. 7 is a flowchart showing the leakage abnormality diagnosis operation of the second purge pipe, according to a fourth embodiment of the present disclosure.

Referring to FIG. 7, a fourth embodiment of the present disclosure will be described. According to the first embodiment, the second embodiment and the third embodiment, the leakage abnormality of the second purge pipe 46 is detected.

The fourth embodiment differs from the first embodiment, the second embodiment and the third embodiment that a specification of the leakage abnormality including two types that are the pipe removing and the pipe leakage can be detected and distinguished.

In a flowchart shown in FIG. 7, since operations at step S401 to step S409 are the same as the operations at step S101 to step S109 shown in FIG. 2, descriptions will be omitted. Further, a constitution of the abnormality detection device according to the fourth embodiment is the same as that of the abnormality detection device shown in FIG. 1 according to the first embodiment.

At step S410, the ECU 10 determines whether the differential pressure DA calculated at step S402 is greater than or equal to a determination value B (second threshold) and the differential pressure DA is less than or equal to the determination value A (first threshold). The determination value A is the same as the determination value A according to the first embodiment, the second embodiment and the third embodiment. For example, the determination value A can be set to a positive value close to the differential pressure DA in a case (hereafter, normal state) where the second purge pipe 46 is normally connected with the intake pipe 21 at a position upstream of the supercharger (compressor 23). The determination value B is set to a value where the differential pressure when the specification of the leakage abnormality of the second purge pipe 46 is the pipe removing and the differential pressure when the specification of the leakage abnormality of the second purge pipe 46 is the pipe leakage can be distinguished. The determination value B is a positive value less than the determination value A.

When the ECU 10 determines that the differential pressure DA is greater than or equal to the determination value B and the differential pressure DA is less than or equal to the determination value A at step S410 (step S410 is Yes), a rate of a decreasing of the differential pressure DA is relatively smaller than that in the normal state (DA>A). Thus, the ECU 10 determines that the pipe leakage where a leakage quantity is relatively small occurs. At step S411, the ECU 10 counts up a counter value Cfaultb. In other words, the ECU 10 adds one to the counter value Cfaultb. The counter value Cfaultb indicates a continuous time interval where the differential pressure DA is greater than or equal to the determination value B and is less than or equal to the determination value A. When an operation at step S4111 is completed, the ECU 10 proceeds to step S412.

At step S412, the ECU 10 determines whether the counter value Cfaultb is greater than a determination threshold KFAULT that is predetermined. In this case, the determination threshold KFAULT indicates a required time interval from a time point that the differential pressure DA becomes greater than or equal to the determination value B and less than or equal to the determination value A to a time point that a phenomenon where the differential pressure DA is continuously being greater than or equal to the determination value B and less than or equal to the determination value A is ensured to be generated due to an occurrence of the pipe leakage. When the ECU 10 determines that the counter value Cfaultb is greater than the determination threshold KFAULT that is predetermined at step S412 (step S412 is Yes), the ECU 10 ensures that the pipe leakage of the leakage abnormality occurs at the second purge pipe 46. In this case, at step S413, the ECU 10 determines that the pipe leakage occurs. At step S414, the ECU 10 resets the counter values Cfaulta and Cfaultb and the timer value Timer1 (sets the counter values Cfaulta and Cfaultb and the time value Timer1 to zero), and then terminates the present leakage abnormality diagnosis operation. The ECU 10 can execute a notification of the occurrence of the pipe leakage to the driver of the vehicle GC through the notification device 60, while executing an operation at step S413.

When the ECU 10 determines that the counter value Cfaultb is less than or equal to the determination threshold KFAULT that is predetermined at step S412 (step S412 is No), the ECU 10 determines that a sufficient time interval has not elapsed to ensure the occurrence of the pipe leakage. In this case, the ECU 10 terminates the present leakage abnormality diagnosis operation to prevent an erroneous determination.

When the ECU 10 determines that the differential pressure DA is less than the determination value B at step S410 (step S410 is No), the rate of the decreasing of the differential pressure DA is relatively larger than that in the normal state (DA>A). Thus, the ECU 10 determines that the pipe removing where the leakage quantity is relatively small occurs. At step S415, the ECU 10 counts up the counter value Cfaulta. In other words, the ECU 10 adds one to the counter value Cfaulta. The counter value Cfaulta indicates a continuous time interval where the differential pressure DA is less than the determination value B. When an operation at step S415 is completed, the ECU 10 proceeds to step S416.

At step S416, the ECU 10 determines whether the counter value Cfaulta is greater than the determination threshold KFAULT that is predetermined. In this case, the determination threshold KFAULT indicates a required time interval from a time point that the differential pressure DA becomes less than the determination value B to a time point that a phenomenon where the differential pressure DA is continuously being less than the determination value B is ensured to be generated due to an occurrence of the pipe removing. When the ECU 10 determines that the counter value Cfaulta is greater than the determination threshold KFAULT that is predetermined at step S416 (step S416 is Yes), the ECU 10 ensures that the pipe removing of the leakage abnormality occurs at the second purge pipe 46. In this case, at step S417, the ECU 10 determines that the pipe removing occurs. At step S418, the ECU 10 resets the counter values Cfaulta and Cfaultb and the timer value Timer1 (sets the counter values Cfaulta and Cfaultb and the time value Timer1 to zero), and then terminates the present leakage abnormality diagnosis operation. The ECU 10 can execute a notification of the occurrence of the pipe removing to the driver of the vehicle GC through the notification device 60, while executing an operation at step S417.

When the ECU 10 determines that the counter value Cfaulta is less than or equal to the determination threshold KFAULT that is predetermined at step S416 (step S416 is No), the ECU 10 determines that a sufficient time interval has not elapsed to ensure the occurrence of the pipe removing. In this case, the ECU 10 terminates the present leakage abnormality diagnosis operation to prevent an erroneous determination.

Since the ECU 10 determines that the engine EG is in an operation state where the ECU 10 cannot allow the abnormality determination at step S403, at step S419, the ECU 10 resets the counter values Cfaulta and Cfaultb and the timer value Timer1 (sets the counter values Cfaulta and Cfaultb and the timer value Timer1 to zero), and then terminates the present leakage abnormality diagnosis operation to prevent an erroneous determination.

The abnormality detection device of the internal combustion engine according the fourth embodiment has a constitution the same as that of the abnormality detection device of the internal combustion engine according to the first embodiment. Similar to the abnormality detection device of the internal combustion engine according to the first embodiment, the abnormality detection device of the internal combustion engine according to the fourth embodiment detects the leakage occurrence of the second purge pipe 46 based on the differential pressure DA between the valve pressure BA and the atmospheric pressure PA. In this case, the valve pressure Ba is the pipe pressure in the second purge pipe 46 between the second purge valve 47 and the intake pipe 21. Further, similar to the abnormality detection devices according to the second embodiment and the third embodiment, a configuration where the leakage occurrence of the second purge pipe 46 is detected based on the differential pressure between (i) the pipe pressure in the second purge pipe 46 between the second purge valve 47 and the intake pipe 21 and (ii) the pipe pressure in the second purge pipe 46 between the second purge valve 47 and the canister 42 can be applied to the abnormality detection device of the internal combustion engine according to the fourth embodiment that is described referring to FIG. 7. Thus, the abnormality detection device of the internal combustion engine according to the fourth embodiment can achieve the same effects as those according to the first embodiment, the second embodiment and the third embodiment.

According to the fourth embodiment, the ECU 10 that is equivalent to the abnormality detection unit detects that the pipe leakage of the second purge pipe 46 occurs when the differential pressure DP is less than or equal to the determination value A and is greater than or equal to the determination value B, and detects that the pipe removing of the second purge pipe 46 occurs when the differential pressure DP is less than the determination value B. According to the above configuration, since the pipe removing and the pipe leakage that are main reasons of the leakage abnormality of the second purge pipe 46 can be distinguished, a detection result of the leakage abnormality of the second purge pipe 46 can be further useful.

According to the fourth embodiment, a configuration where two types of the leakage abnormality including the pipe removing and the pipe leakage can be distinguished by comparisons between the differential pressure DP and the determination values A, B is described. However, a configuration where three or more types of the leakage abnormality can be distinguished by increasing a total number of the determination values to be three or more can be applied to the fourth embodiment.

Fifth Embodiment

Figure 8:
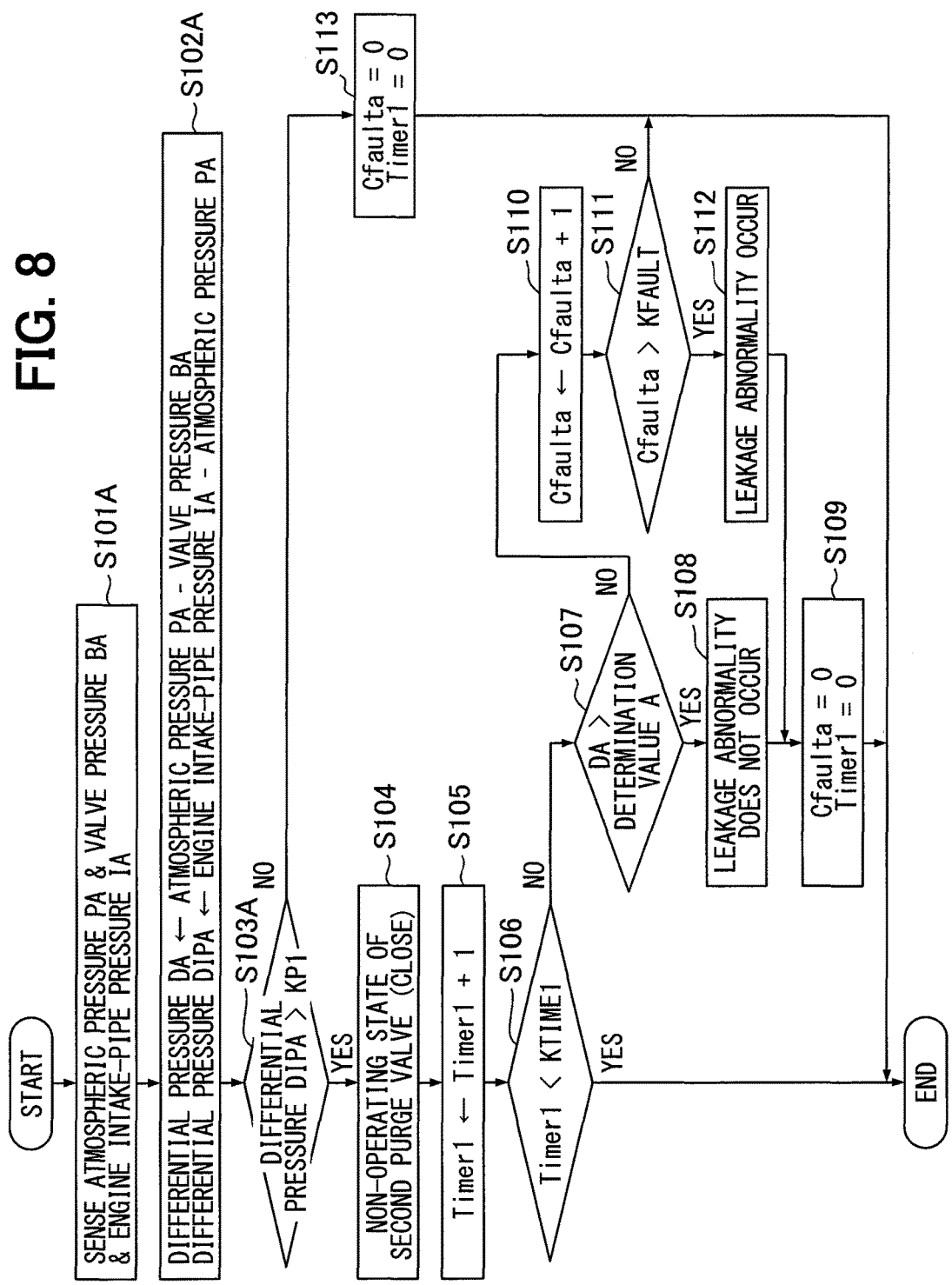
FIG. 8 is a flowchart showing the leakage abnormality diagnosis operation of the second purge pipe, according to a fifth embodiment of the present disclosure.

Referring to FIG. 8, a fifth embodiment of the present disclosure will be described. The fifth embodiment differs from the first embodiment that in the leakage abnormality diagnosis operation, it is determined whether an executing condition of the leakage abnormality diagnosis operation that the engine EG is in the supercharging operation state is met.

In a flowchart shown in FIG. 8, since operations at step S104 to step S113 are the same as those shown in FIG. 2, descriptions will be omitted. Hereafter, different points between FIG. 8 and FIG. 2 which are step S101A, step S102A and step S103A will be described.

At step S101A, the ECU 10 senses the atmospheric pressure PA that is the reference pressure, the valve pressure BA and the engine intake-pipe pressure IA. When an operation at step S101A is completed, the ECU 10 proceeds to step S102A.

At step S102A, the ECU 10 calculates the differential pressure DA between the atmospheric pressure PA and the valve pressure BA which are sensed at step S101A and calculates a differential pressure DIPA between the engine intake-pipe pressure IA and the atmospheric pressure PA which are sensed at step S101A. The ECU 10, for example, calculates the differential pressure DA by subtracting the valve pressure BA from the atmospheric pressure PA that is the reference pressure and calculates the differential pressure DIPA by subtracting the atmospheric pressure PA from the engine intake-pipe pressure IA. When an operation at step S102A is completed, the ECU 10 proceeds to step S103A.

At step S103A, the ECU 10 determines whether the differential pressure DIPA calculated at step S102A is greater than the supercharging threshold KP1 that is predetermined. When the ECU 10 determines that the differential pressure DIPA is greater than the supercharging threshold KP1 at step S103A (step S103A is Yes), the ECU 10 determines that the engine EG is in the supercharging operation state, determines that the engine EG is an operation state where the ECU 10 can allow the abnormality determination, and then proceeds to step S104. When the ECU 10 determines that the differential pressure DIPA is less than or equal to the supercharging threshold KP1 at step S103A (step S103A is No), the ECU 10 determines that the engine EG is not in the supercharging operation state, determines that the engine EG is in an operation state where the ECU 10 cannot allow the abnormality determination, and then proceeds to step S113.

As the above description, the abnormality detection device can determine a supercharging region at a position where the atmospheric pressure PA is low by determining the supercharging region by using the differential pressure DIPA between the engine intake-pipe pressure IA and the atmospheric pressure PA. Thus, the abnormality detection device can diagnose the leakage occurrence without being affected by the atmospheric pressure PA.

Since a constitution of the abnormality detection device of the internal combustion engine according to the fifth embodiment is the same as the that of the abnormality detection device of the internal combustion engine according to the first embodiment except a determination operation of the supercharging region, the abnormality detection device of the internal combustion engine according to the fifth embodiment can achieve the same effects as the abnormality detection device of the internal combustion engine according to the first embodiment. The determination operation of the supercharging region according to the fifth embodiment described referring to FIG. 8 can be applied to the second embodiment, the third embodiment and the fourth embodiment. In the second embodiment, the third embodiment and the fourth embodiment, when the valve upstream pressure BA2 is used to replace the atmospheric pressure PA as the reference pressure, the atmospheric pressure PA used at step S101A to step S103A may be replaced by the valve upstream pressure BA2.

As the above description, the embodiment of the present disclosure is described. However, the present disclosure is not limited to the above embodiment. Such changes and modifications are to be understood as being within the scope of the present disclosure as defined by the appended claims. Each of the components in the above embodiments and an arrangement, a condition and a shape of the each of the components are not limited and can be properly modified. The components in the above embodiments can be combined with each other when a technical contradiction does not occur.

According to the above embodiments, a timing that executes the leakage abnormality diagnosis operation of the second purge pipe 46 is a timing when the engine EG is in the supercharging operation state. However, since it is preferable that the engine EG is operating at an operation condition where a pressure at a position in the intake pipe 21 upstream of the compressor 23 is a negative pressure, the timing that executes the leakage abnormality diagnosis operation can be set to a timing that the engine EG is operating at an operation condition other than the supercharging operation state.

According to the above embodiments, the atmospheric pressure PA or the valve upstream pressure BA2 is used as the reference pressure to calculate the differential pressure DP. However, since it is preferable that the reference pressure is set to a value where the differential pressure DP is a significant difference according to the leakage occurrence of the second purge pipe 46, a pressure value other than the atmospheric pressure PA and the valve upstream pressure BA2 can be used as the reference pressure.

According to the above embodiments, the second purge pipe 46 is switched to be opened/closed by a control of an opening/closing of the second purge valve 47. However, the second purge pipe 46 may be switched by a member other than a valve.

The invention claimed is:

1. An abnormality detection device for an internal combustion engine comprising:
    a canister to absorb an evaporation fuel that is generated by an evaporation of a fuel in a fuel tank;
    a purge pipe to be connected between the canister and an upstream part of an intake pipe of the internal combustion engine upstream of a supercharger, the purge pipe to supply the evaporation fuel to the intake pipe;
    a switching unit to be located in the purge pipe, the switching unit to switch to open/close the purge pipe; and
    an abnormality detection unit to detect a leakage occurrence of the purge pipe based on a differential pressure between an intake pipe-side pipe pressure and a reference pressure that is predetermined, when the internal combustion engine is operating at a specified operation condition where a pressure at the upstream part is a negative pressure and the purge pipe is closed by the switching unit, wherein the intake pipe-side pipe pressure is a pressure at a position in the purge pipe between the switching unit and the intake pipe.

2. The abnormality detection device for the internal combustion engine according to claim 1, wherein
    the specified operation condition includes a supercharging operation state that the supercharger operates.

3. The abnormality detection device for the internal combustion engine according to claim 1, wherein
    the reference pressure is an atmospheric pressure.

4. The abnormality detection device for the internal combustion engine according to claim 3, further comprising:
    a pressure sensor to be located at a position in the purge pipe between the switching unit and the intake pipe, the pressure sensor to sense the intake pipe-side pipe pressure; and
    an atmospheric-pressure sensor to sense the atmospheric pressure, wherein
    the abnormality detection unit calculates the differential pressure between the intake pipe-side pipe pressure sensed by the pressure sensor and the atmospheric pressure sensed by the atmospheric-pressure sensor and detects the leakage occurrence of the purge pipe when the differential pressure is less than or equal to a threshold.

5. The abnormality detection device for the internal combustion engine according to claim 1, wherein
    the reference pressure is a canister-side pipe pressure that is a pressure in the purge pipe between the switching unit and the canister.

6. The abnormality detection device for the internal combustion engine according to claim 5, further comprising:
    a first pressure sensor to be located at a position in the purge pipe between the switching unit and the intake pipe, the first pressure sensor to sense the intake pipe-side pipe pressure; and
    a second pressure sensor to be located at a position in the purge pipe between the switching unit and the canister, the second pressure sensor to sense the canister-side pipe pressure, wherein
    the abnormality detection unit calculates the differential pressure between the intake pipe-side pipe pressure sensed by the first pressure sensor and the canister-side pipe pressure sensed by the second pressure sensor and detects the leakage occurrence of the purge pipe when the differential pressure is less than or equal to a threshold.

7. The abnormality detection device for the internal combustion engine according to claim 5, further comprising:
    a differential-pressure sensor to sense the differential pressure between (i) a pipe pressure in the purge pipe between the switching unit and the intake pipe and (ii) the pipe pressure in the purge pipe between the switching unit and the canister, wherein
    the abnormality detection unit detects the leakage occurrence of the purge pipe when the differential pressure sensed by the differential-pressure sensor is less than or equal to a threshold.

8. The abnormality detection device for the internal combustion engine according to claim 4, wherein
    the threshold includes a first threshold and a second threshold less than the first threshold,
    the abnormality detection unit detects that a pipe leakage of the purge pipe occurs, when the differential pressure is less than or equal to the first threshold and is greater than or equal to the second threshold, and
    the abnormality detection unit detects that a pipe removing of the purge pipe occurs, when the differential pressure is less than the second threshold.

9. The abnormality detection device for the internal combustion engine according to claim 2, wherein
    when an intake-pipe pressure of the internal combustion engine is greater than or equal to a predetermined value, the abnormality detection device determines that the internal combustion engine is in the supercharging operation state.

10. The abnormality detection device for the internal combustion engine according to claim 2, wherein
    when a differential pressure between an intake-pipe pressure of the internal combustion engine and the reference pressure is greater than or equal to a predetermined value, the abnormality detection device determines that the internal combustion engine is in the supercharging operation state.

11. The abnormality detection device for the internal combustion engine according to claim 6, wherein
    the threshold includes a first threshold and a second threshold less than the first threshold, the abnormality detection unit detects that a pipe leakage of the purge pipe occurs, when the differential pressure is less than or equal to the first threshold and is greater than or equal to the second threshold, and the abnormality detection unit detects that a pipe removing of the purge pipe occurs, when the differential pressure is less than the second threshold.

12. The abnormality detection device for the internal combustion engine according to claim 7, wherein the threshold includes a first threshold and a second threshold less than the first threshold, the abnormality detection unit detects that a pipe leakage of the purge pipe occurs, when the differential pressure is less than or equal to the first threshold and is greater than or equal to the second threshold, and the abnormality detection unit detects that a pipe removing of the purge pipe occurs, when the differential pressure is less than the second threshold.

13. The abnormality detection device for the internal combustion engine according to claim 2, further comprising:

a determination unit to determine that the internal combustion engine is in the supercharging operation state, when an intake-pipe pressure of the internal combustion engine is greater than or equal to a predetermined value.

14. The abnormality detection device for the internal combustion engine according to claim 2, further comprising:

a determination unit to determine that the internal combustion engine is in the supercharging operation state, when a differential pressure between an intake-pipe pressure of the internal combustion engine and the reference pressure is greater than or equal to a predetermined value.

* * * * *